United States Patent
Belzacq et al.

(10) Patent No.: US 10,380,922 B2
(45) Date of Patent: Aug. 13, 2019

(54) ABDOMINAL MODEL FOR LAPAROSCOPIC ABDOMINAL WALL REPAIR/RECONSTRUCTION SIMULATION

(71) Applicant: Sofradim Production, Trévoux (FR)

(72) Inventors: Tristan Belzacq, Trevoux (FR); Frederic Turquier, Saint Cyr au Mont d'Or (FR); Anthony Vegleur, Gard (FR)

(73) Assignee: Sofradim Production, Trévoux (FR)

( * ) Notice: Subject to any disclaimer, the term of this patent is extended or adjusted under 35 U.S.C. 154(b) by 164 days.

(21) Appl. No.: 15/582,799

(22) Filed: May 1, 2017

(65) Prior Publication Data
US 2017/0352295 A1 Dec. 7, 2017

(30) Foreign Application Priority Data
Jun. 3, 2016 (EP) .................................... 16305647

(51) Int. Cl.
*G09B 23/28* (2006.01)
*G09B 23/32* (2006.01)
(Continued)

(52) U.S. Cl.
CPC ............ *G09B 23/32* (2013.01); *G06T 7/0012* (2013.01); *G09B 9/00* (2013.01); *G09B 23/285* (2013.01);
(Continued)

(58) Field of Classification Search
CPC .... G09B 23/28; G09B 23/285; G09B 23/286; G09B 23/30; G09B 23/303; G09B 23/306
(Continued)

(56) References Cited

U.S. PATENT DOCUMENTS

| 4,575,805 A | 3/1986 | Moermann et al. |
| 5,664,109 A | 9/1997 | Johnson et al. |

(Continued)

FOREIGN PATENT DOCUMENTS

| EP | 3002580 A1 | 4/2016 |
| EP | 3223181 A1 | 9/2017 |

OTHER PUBLICATIONS

Podwojewski et al, "Mechanical Response of Human Abdominal Walls ex vivo: Effect of an Incisional Hernia and a Mesh Repair", Journal of the Mechanical Behavior of Biomedical Materials 38 (2014), p. 126-333.*

(Continued)

*Primary Examiner* — Kurt Fernstrom

(57) ABSTRACT

A physical abdominal surgical simulation system including an abdominal model mimicking the biomechanical properties and response of a patient specific abdomen and an image acquisition and analysis system. The abdominal model includes an abdominal wall model insert forming a frame of the abdominal model, an abdominal wall member secured to the abdominal wall model insert, a back member secured to the abdominal wall model insert in opposed relation with respect to the abdominal wall member, and an abdominal model cavity defined within abdominal wall model insert, the abdominal wall member, and the back member. The image acquisition and analysis system includes a plurality of cameras configured to capture images of the abdominal model cavity.

31 Claims, 5 Drawing Sheets

(51) Int. Cl.
*G06T 7/00* (2017.01)
*G09B 9/00* (2006.01)
*H04N 7/18* (2006.01)

(52) U.S. Cl.
CPC ... *H04N 7/181* (2013.01); *G06T 2207/30092* (2013.01); *G06T 2207/30204* (2013.01)

(58) Field of Classification Search
USPC .............................. 434/262, 267, 268, 272
See application file for complete search history.

(56) References Cited

U.S. PATENT DOCUMENTS

| | | | |
|---|---|---|---|
| 6,151,581 A | 11/2000 | Kraftson et al. | |
| 6,162,962 A | 12/2000 | Hinsch et al. | |
| 6,177,940 B1 | 1/2001 | Bond et al. | |
| 6,463,351 B1 | 10/2002 | Clynch | |
| 6,772,026 B2 | 8/2004 | Bradbury et al. | |
| 6,875,176 B2 | 4/2005 | Mourad et al. | |
| 7,074,183 B2 | 7/2006 | Castellanos | |
| 7,239,937 B2 | 7/2007 | Slemker et al. | |
| 7,356,379 B2 | 4/2008 | Slemker et al. | |
| 7,364,544 B2 | 4/2008 | Castellanos | |
| 7,371,067 B2 | 5/2008 | Anderson et al. | |
| 7,379,885 B1 | 5/2008 | Zakim | |
| 7,457,804 B2 | 11/2008 | Uber, III et al. | |
| 7,556,045 B1 | 7/2009 | Recknor et al. | |
| 7,769,603 B2 | 8/2010 | Jung et al. | |
| 7,811,297 B2 | 10/2010 | Cox et al. | |
| 7,991,485 B2 | 8/2011 | Zakim | |
| 7,996,381 B2 | 8/2011 | Uber, III et al. | |
| 8,095,382 B2 | 1/2012 | Boyden et al. | |
| 8,116,900 B2 | 2/2012 | Slemker et al. | |
| 8,135,596 B2 | 3/2012 | Jung et al. | |
| 8,147,537 B2 | 4/2012 | Boyden et al. | |
| 8,165,896 B2 | 4/2012 | Jung et al. | |
| 8,246,663 B2 | 8/2012 | Lovald et al. | |
| 8,297,982 B2 | 10/2012 | Park et al. | |
| 8,430,922 B2 | 4/2013 | Jung et al. | |
| 8,475,517 B2 | 7/2013 | Jung et al. | |
| 8,478,437 B2 | 7/2013 | Boyden et al. | |
| 8,521,552 B2 | 8/2013 | Niwa | |
| 8,521,716 B2 | 8/2013 | Uber, III et al. | |
| 8,551,155 B2 | 10/2013 | Jung et al. | |
| 8,606,591 B2 | 12/2013 | Heniford et al. | |
| 8,775,133 B2 | 7/2014 | Schroeder | |
| 8,840,403 B2 * | 9/2014 | Segall | G09B 23/28 434/272 |
| 2002/0007294 A1 | 1/2002 | Bradbury et al. | |
| 2004/0243481 A1 | 12/2004 | Bradbury et al. | |
| 2005/0216305 A1 | 9/2005 | Funderud | |
| 2006/0079773 A1 | 4/2006 | Mourad et al. | |
| 2006/0206038 A1 | 9/2006 | Jenkins et al. | |
| 2007/0118243 A1 | 5/2007 | Schroeder et al. | |
| 2007/0275359 A1 * | 11/2007 | Rotnes | A61B 90/36 434/262 |
| 2007/0294210 A1 | 12/2007 | Jung et al. | |
| 2008/0138781 A1 * | 6/2008 | Pellegrin | G09B 23/34 434/274 |
| 2009/0119130 A1 | 5/2009 | Kimmel et al. | |
| 2012/0015337 A1 * | 1/2012 | Hendrickson | G09B 23/303 434/267 |
| 2012/0202179 A1 * | 8/2012 | Fedotov | G09B 23/285 434/267 |
| 2013/0101973 A1 * | 4/2013 | Hoke | G09B 23/34 434/267 |
| 2013/0116711 A1 | 5/2013 | Altman et al. | |
| 2013/0116785 A1 | 5/2013 | Altman et al. | |
| 2013/0157240 A1 * | 6/2013 | Hart | G09B 23/30 434/267 |
| 2013/0231911 A1 | 9/2013 | Brown et al. | |
| 2014/0248596 A1 * | 9/2014 | Hart | G09B 23/30 434/272 |
| 2014/0272878 A1 * | 9/2014 | Shim | G09B 23/30 434/272 |
| 2014/0329217 A1 * | 11/2014 | Barsness | G09B 23/306 434/272 |
| 2014/0342334 A1 | 11/2014 | Black et al. | |
| 2015/0031008 A1 * | 1/2015 | Black | G09B 23/285 434/272 |
| 2015/0086955 A1 * | 3/2015 | Poniatowski | G09B 23/28 434/267 |
| 2015/0187229 A1 * | 7/2015 | Wachli | G09B 23/285 434/272 |

OTHER PUBLICATIONS

European Search Report for EP16305647.6 date of completion is Nov. 8, 2016 (11 pages).
Podwojewski F et al, "Mechanical response of human abdominal wallsex vivo:Effect of an incisional hernia and a mesh repair", Journal of the Mechanical Behavior of Biomedical Materials, Elsevier, Amsterdam, NL, (Jul. 9, 2014), vol. 38, doi:10.1016/J.JMBBM. 2014.07.002, ISSN 1751-6161, pp. 126-133, XP029016613 [I] 1-15 * the whole document *.
Ritchie et al, "Biomechanical evaluation of three fixation modalities for preperitoneal inguinal hernia repair: a 24-hour postoperative study in pigs", Medical Devices: Evidence and Research, (Dec. 1, 2014), doi:10.2147/MDER.S71035, p. 437, XP055316236 [I] 1-15 * the whole document *.
F. Podwojewski et al, "Mechanical response of animal abdominal walls in vitro: Evaluation of the influence of a hernia defect and a repair with a mesh implanted intraperitoneally", Journal of Biomechanics, US, (Feb. 1, 2013), vol. 46, No. 3, doi:10.1016/j.jbiomech. 2012.09.014, ISSN 0021-9290, pp. 561-566, XP055316288 [I] 1-15 * the whole document *.
Schwab R et al, "Biomechanical analyses of mesh fixation in TAPP and TEP hernia repair", Surgical Endoscopy; and Other Interventional Techniques Official Journal of the Society of American Gastrointestinal and Endoscopic Surgeons (SAGES) and European Association for Endoscopic Surgery (EAES), Springer-Verlag, NE, (Jul. 11, 2007), vol. 22, No. 3, ISSN 1432-2218, pp. 731-738, XP019591041 [I] 1-15 * the whole document *.
Song C et al, "Mechanical properties of the human abdominal wall measured in vivo during insufflation for laparoscopic surgery", Surgical Endoscopy; and Other Interventional Techniques Official Journal of the Society of American Gastrointestinal and Endoscopic Surgeons (SAGES) and European Association for Endoscopic Surgery (EAES), Springer-Verlag, NE, (May 12, 2006), vol. 20, No. 6, doi:10.1007/S00464-005-0676-6, ISSN 1432-2218, pp. 987-990, XP019428702 [A] 1-15.

* cited by examiner

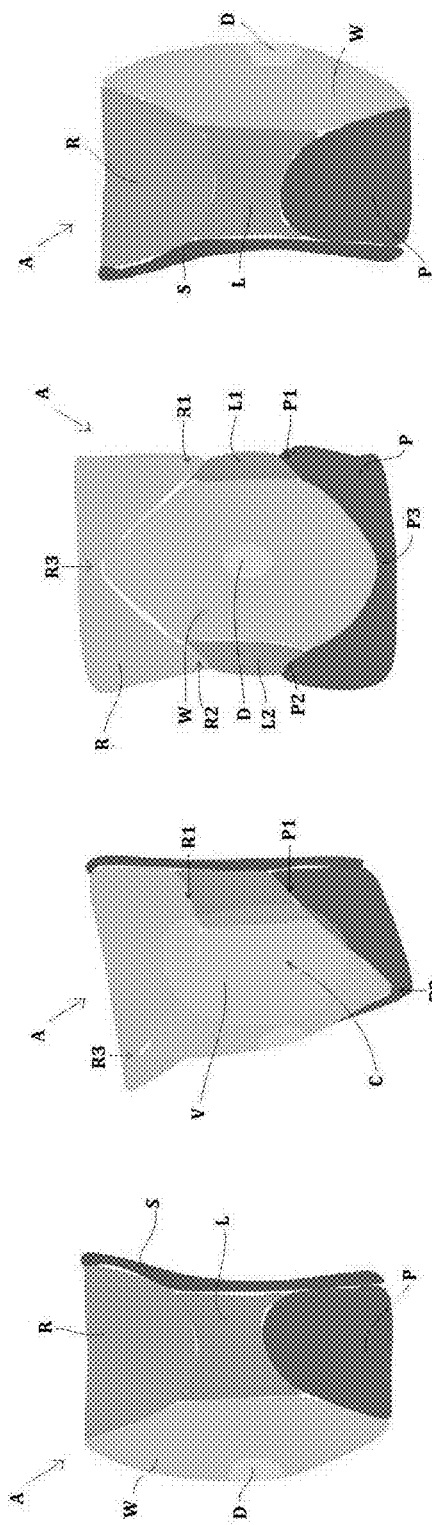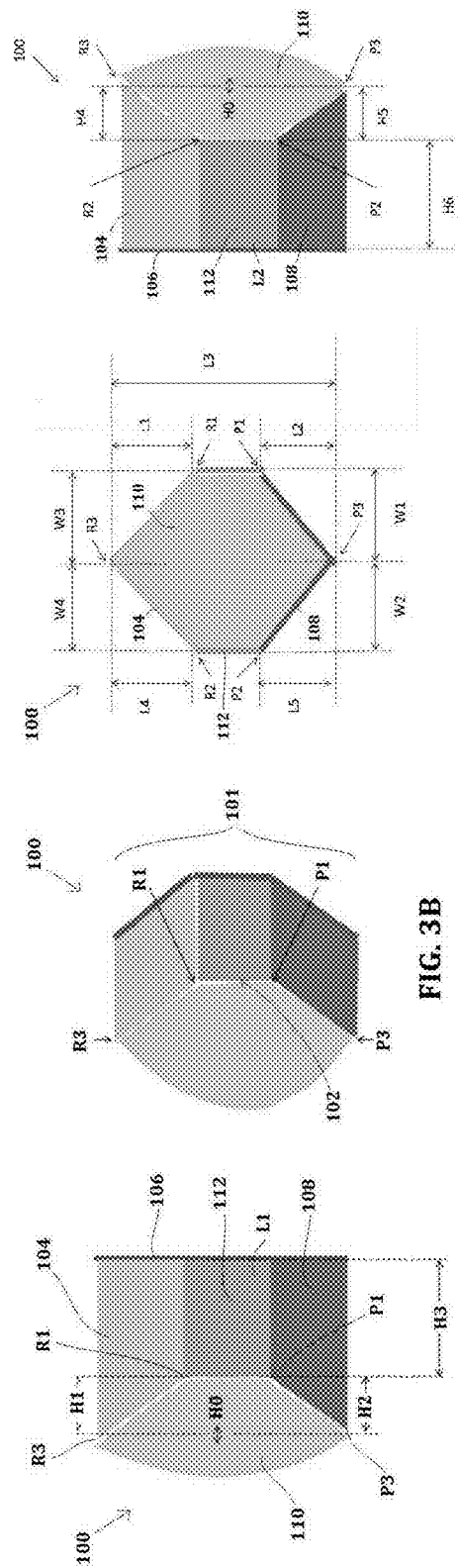

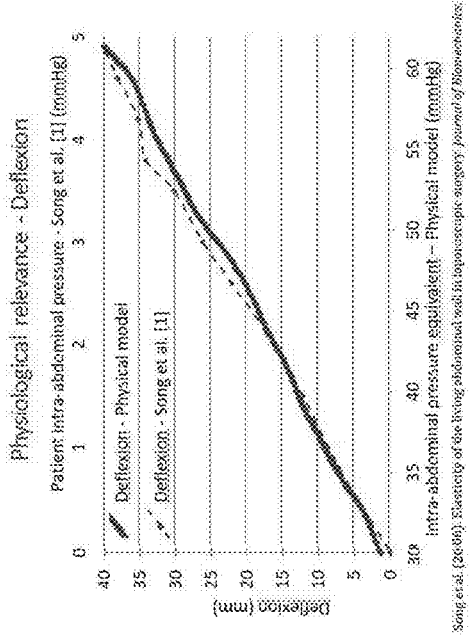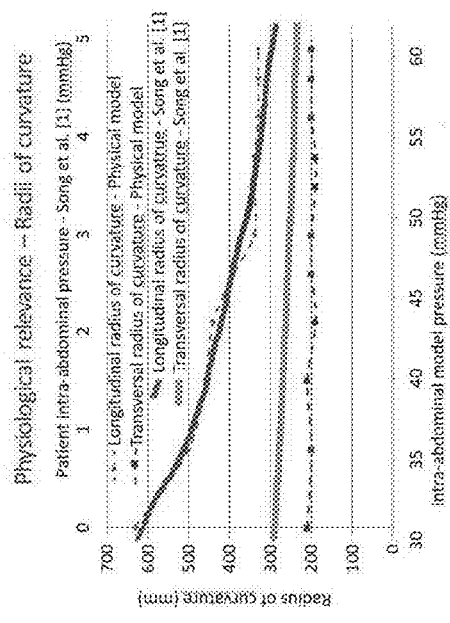

ABDOMINAL MODEL FOR LAPAROSCOPIC ABDOMINAL WALL REPAIR/RECONSTRUCTION SIMULATION

CROSS-REFERENCE TO RELATED APPLICATIONS

This application claims benefit of and priority to European Patent Application Serial No. 16305647.6 filed Jun. 3, 2016, the disclosure of the above-identified application is hereby incorporated by reference in its entirety.

TECHNICAL FIELD

The present disclosure relates to simulation of a surgical procedure on an anatomical model, and more particularly, to a system, device, and method for physically simulating an abdomen of a patient during a laparoscopic surgical procedure, and assessing the physical outputs of the laparoscopic surgical procedure on the simulated abdomen.

BACKGROUND

Techniques for repairing damaged or diseased tissue are widespread in medicine. In laparoscopic procedures, abdominal wall repairs/reconstructions are conducted while the abdominal wall is inflated. The inflation increases the volume of the abdominal cavity, separating the abdominal viscera from the abdominal wall and creating a workspace for the abdominal wall repair/reconstruction procedure. Deflation, however, after completion of the surgical procedure can lead to physical changes of the abdominal wall repair/reconstruction.

Surgical implants, such as sutures, staples, or tacks, as well as tissue reinforcements/replacement devices like meshes or patches, are frequently used for abdominal wall repairs/reconstructions. For example, in the case of abdominal wall hernias, techniques involving the use of a mesh or patch to reinforce the abdominal wall are used. The mesh or patch is generally soft and pliant in order to conform to the abdominal wall and flex with movement of the abdominal wall. The mesh or patch may be held in place by suturing, stapling, or tacking the mesh or patch to surrounding tissue of the abdominal wall.

It would be advantageous to provide a clinician with the ability to assess the physical changes that occur in an abdomen after completion of a surgical procedure, including the performance of surgical implants, in a patient specific environment.

SUMMARY

The present disclosure is directed to systems, devices, and methods for assessing the physical outputs of a laparoscopic surgical procedure on a physical abdominal model.

For awareness of the physical changes that occur after completion of a surgical procedure, differences are calculated between the physical inputs implemented during a simulated laparoscopic surgical procedure while the abdominal model is in an inflated state and the physical outputs realized from the simulated laparoscopic surgical procedure when the abdominal model is in a deflated state. In embodiments, the analysis of the shift between inflated and deflated states in an abdominal model during a simulated laparoscopic surgical procedure increases a clinician's understanding/expertise. In some embodiments, the analysis, in combination with the simulation of the laparoscopic surgical procedure, allows a clinician to evaluate the performance of surgical implants and/or surgical techniques for various abdominal conditions. In certain embodiments, the analysis, in combination with the simulation of the laparoscopic surgical procedure on a patient specific abdominal model, provides a clinician with a surgical rehearsal platform and knowledge for revising a surgical plan to decrease the likelihood of failure.

In one aspect of the present disclosure, a physical abdominal surgical simulation system includes an abdominal model mimicking a patient specific abdomen and an image acquisition and analysis system. The abdominal model includes: an abdominal wall model insert forming a frame of the abdominal model; an abdominal wall member having biomechanical properties mimicking the biomechanical response of the patient specific abdomen, the abdominal wall member secured to the abdominal wall model insert; a back member secured to the abdominal wall model insert in opposed relation with respect to the abdominal wall member; and an abdominal model cavity defined within abdominal wall model insert, the abdominal wall member, and the back member. The image acquisition and analysis system includes a plurality of cameras configured to capture images of the abdominal model cavity.

In embodiments, the abdominal model further includes an abdominal wall defect in the abdominal wall member. In embodiments, the abdominal model is free of an abdominal wall defect in the abdominal wall member.

In embodiments, the abdominal model may include an abdominal viscera member positioned within the abdominal model cavity between the back member and the abdominal wall member. In embodiments, the abdominal model is free of an abdominal viscera member.

In another aspect of the present disclosure, a method of simulating a laparoscopic surgical procedure in a physical abdominal model mimicking an abdomen of a patient, includes: insufflating an abdominal wall member of an abdominal model to a first inflated state; securing at least one surgical implant to an inner surface of the abdominal wall member of the abdominal model; capturing a first set of images of the at least one surgical implant in the first inflated state; deflating the abdominal wall member of the abdominal model to a deflated state; and capturing a first set of images of the at least one surgical implant in the deflated state. The first sets of images of the at least one surgical implant in the first inflated state and the deflated state may be compared.

In embodiments, the method may further include: inflating the abdominal wall member of the abdominal model to a second inflated state; re-securing the at least one surgical implant on the inner surface of the abdominal wall member of the abdominal model; capturing a second set of images of the at least one surgical implant in the second inflated state; deflating the abdominal wall member of the abdominal model to the deflated state; and capturing a second set of images of the at least one surgical implant in the deflated state. Re-securing of the at least one surgical implant may include varying at least one of placement of the at least one surgical implant, fixation distribution of the at least one surgical implant, fixation modality of the at least one surgical implant, or selection of the at least one surgical implant, and comparing the first and second sets of images may include analyzing at least one physical output based on the variation. The securing and the re-securing of the at least one surgical implant may be compared in the inflated states and in the deflated states using the sets of images.

Other aspects, features, and advantages will be apparent from the description, drawings, and the claims.

BRIEF DESCRIPTION OF THE DRAWINGS

Embodiments of the presently disclosed systems, devices, and methods are described herein with reference to the drawings, wherein:

FIGS. 2A-2D are lateral left, oblique, anterior, and lateral right views of schematic illustrations of an abdomen of a patient to be modeled by the abdominal surgical simulation system of FIGS. 1A-1C;

FIGS. 3A-3D are lateral left, oblique, anterior, and lateral right views of schematic illustrations of an abdominal model of the abdominal surgical simulation system of FIGS. 1A-1C, that mimics the abdomen of FIGS. 2A-2D in accordance with an embodiment of the present disclosure;

FIGS. 4A and 4B are graphs showing deflexion and radii of curvature, respectively, of an abdominal wall member in response to changes in intra-abdominal model pressure in accordance with an example of the present disclosure;

Corresponding reference characters indicate corresponding parts throughout the drawings.

DETAILED DESCRIPTION

For the purposes of discussion, the systems, devices, and methods for modeling an abdomen and simulating a laparoscopic surgical procedure will be described with respect to an abdominal model including an abdominal wall member, with or without an abdominal wall member defect, and simulating an abdominal wall reinforcement procedure. The abdominal model is configured to simulate a passive anesthetized abdominal wall during a hernia repair procedure, and to assess the impact of simulated celioscopic intra-abdominal pressure on the hernia repair procedure.

It should be understood, however, that the presently disclosed systems, devices, and methods may be utilized to model the physical structures/properties of an abdomen of any patient undergoing a laparoscopic surgical repair/reconstruction procedure including, for example, abdominal wall hernia repair (defect-closed/augmentation, defect-non-closed/bridging), component separation procedures (e.g., transversus abdominis muscle release), and general tissue resection. The abdominal model may be used with any surgical implants utilized during a laparoscopic surgical procedure including, for example, textile-based implant (e.g., a surgical mesh) and/or tissue fixation devices (e.g., sutures, tacks, staples, adhesives), as well as any surgical/medical devices associated with the performance of the laparoscopic surgical procedure (e.g., access devices (such as SILS™ ports, hand ports, gel ports, etc.), trocars, insufflation needles, laparoscopes, surgical instruments, etc.).

The simulated laparoscopic surgical procedure may be designed to include a desired surgical technique and desired surgical/medical devices and/or surgical implants to be utilized with the surgical technique, and to provide desired physical outputs. For example, if an abdominal wall reinforcement procedure is performed with a textile-based implant, the overlap of the textile-based implant on an abdominal wall member of an abdominal model may be a desired observed physical output. As another example, if a defect closure procedure is performed, the tissue fixation device modalities may be the desired observed physical outputs. Additionally, the simulated laparoscopic surgical procedure may be performed directly by a clinician (e.g., a surgeon) or by remote operation via a robotic surgical system.

Figure 1B:
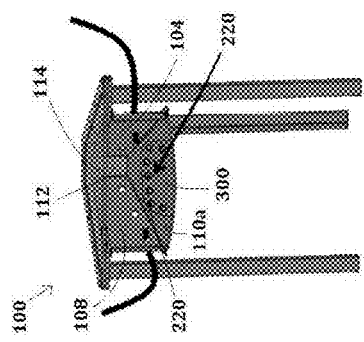
FIG. 1B is a cross-sectional view of an abdominal model of the abdominal surgical simulation system of FIG. 1A.
Figure 1D:
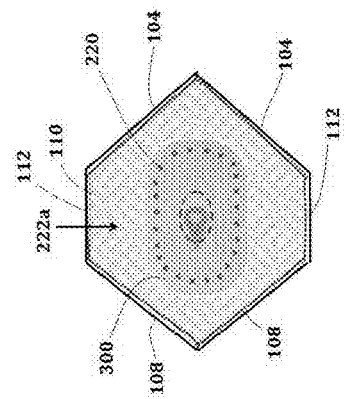
FIG. 1D is a top view of an abdominal wall member of the abdominal model of FIGS. 1A-1C in accordance with an embodiment of the present disclosure.
Figure 1A:
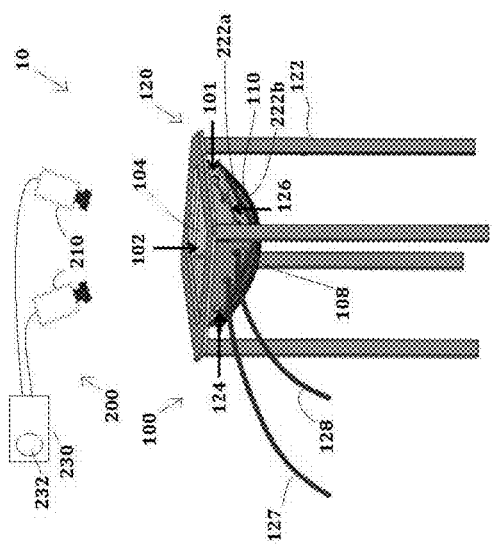
FIG. 1A is a perspective view of an abdominal surgical simulation system in accordance with an embodiment of the present disclosure.

Referring now to FIGS. 1A and 1B, an abdominal surgical simulation system or simulator 10 includes an abdominal model 100 and an image acquisition and analysis system 200 for assessing the physical outputs related to surgical implant(s) 300 implanted in the abdominal model 100 and subjected to a laparoscopic surgical procedure.

The abdominal model 100 is a physical model used to simulate an abdomen of a patient. The abdominal model 100 is personalized to mimic physical structures, environments, and/or physical behaviors of a patient specific abdomen. Physical parameters of the structures and/or environments can be made and/or calibrated to mimic one or more specific physical behaviors of the patient specific abdomen, such as biomechanical and/or thermo-mechanical behaviors, and/or to mimic the physical relationships between physical parameters related to the physical behaviors of the patient specific abdomen, such as the abdominal wall inflation or deflation during changes in intra-abdominal pressure.

An abdomen "A" of a patient is shown, for example, in FIGS. 2A-2D. The abdomen "A" includes an abdominal cavity "C" defined within a ribcage "R" (including left and right lowest floating ribs "R1" and "R2" and a sternum "R3"), a spinal column "S," a pelvis "P" (including left and right iliac crests "P1" and "P2" and a pubis bone "P3"), an anterior abdominal wall "W," and a lateral abdominal wall "L" (including left and right lateral abdominal wall "L1" and "L2", respectively). The abdomen wall "W" has an abdominal wall defect "D" defined therethrough, and abdominal viscera "V" extend inside the abdominal cavity "C." The abdomen "A" may be simulated with structural equivalents in an abdominal model.

As shown in FIGS. 3A-3D, one or more specific structures of the abdomen "A" (FIGS. 2A-2D), and the properties/conditions of said structures, may be translated into an abdominal model 100. The abdominal model 100 includes an abdominal model cavity 102 which represents the abdominal cavity "C" (FIGS. 2A-2D) of the patient, defined within a ribcage member 104 which represents the ribcage "R" (FIGS. 2A-2D) of the patient, a spinal column member 106 which represents the spinal column "S" (FIGS. 2A-2D) of the patient, a pelvis member 108 which represents the pelvis "P" (FIGS. 2A-2D) of the patient, an abdominal wall member 110 which represents the anterior abdominal wall "W" (FIGS. 2A-2D) of the patient, and a lateral abdominal wall member 112 which represents the lateral abdominal wall "L" (FIGS. 2A-2D). The abdominal model 100 also includes an abdominal wall model defect (not shown) which represents the abdominal wall defect "D" (FIGS. 2A-2D) of the patient and abdominal viscera member (not shown) which represents the abdominal viscera "V" (FIGS. 2A-2D) of the patient.

As referred to herein, an abdominal wall model insert 101 includes one or more of the ribcage member 104, the pelvis member 108, and/or the lateral abdominal wall member 112, and a back member 114 (FIG. 1B) includes the spinal column member 106. The abdominal wall model insert 101 and the back member 114, together with the abdominal wall member 110, delimits the abdominal model cavity 102 and contains the abdominal viscera member (not shown).

Physical parameters, such as the anatomy (e.g., size, thickness, and/or geometry) of one or more of the structures of the abdomen "A" (FIGS. 2A-2D), may be represented in the abdominal model 100. For reference and ease of understanding, FIGS. 3A-3D includes references to anatomical features (e.g., the sternum "R3") of the abdomen "A" of FIGS. 2A-2D. As shown in FIG. 3A, for example, the height "H0" from the sternum "R3" to the pubis bone "P3", the height "H1" from the sternum "R3" to left lowest floating rib "R1," the height "H2" from the pubis bone "P3" to the left iliac crest "P1," and the height "H3" of the left lateral abdominal wall "L1," may be measured and represented in the abdominal model 100. In another example, as shown in FIG. 3D, the height "H4" from the sternum "R3" to right lowest floating rib "R2," the height "H5" from the pubis bone "P3" to the right iliac crest "P2," and the height "H6" of the right lateral abdominal wall "L2," may also be measured and represented in the abdominal model 100.

As shown in FIG. 3C, the length "L1" from the sternum "R3" to left lowest floating rib "R1," the length "L2" from the pubis bone "P3" to the left iliac crest "P1," the length "L3" from the pubis bone "P3" to sternum "R3," the length "L4" from the sternum "R3" to right lowest floating rib "R2," the length "L5" from the pubis bone "P3" to the right iliac crest "P2," the width "W1" between the pubis bone "P3" and the left iliac crest "P1," the width "W2" between the pubis bone "P3" and the right iliac crest "P2", the width "W3" between the sternum "R3" and the left lowest rib "R1," and the width "W4" between the sternum "R3" and the right lowest rib "R2" may be measured and represented in the abdominal model 100, among other physical parameters as desired by a clinician. For example, the geometry of an abdominal wall defect "D" (FIGS. 2A-2D) may be measured/calculated and represented in the abdominal model 100 and/or the angles between adjacent structures may be measured/calculated and represented in the abdominal model 100 (e.g., the angle of the ribcage "R" at the sternum "R3").

It is envisioned that the respective heights, lengths, and/or widths described herein on the left side of the abdominal wall model may or may not be symmetrical to the heights, lengths, and/or widths described herein on the right side of the abdominal wall model.

Other physical parameters, such as the material parameters of one or more of the structures of the abdomen "A" (FIGS. 2A-2D), may also be represented in the abdominal model 100. For example, the abdominal structures modeled in the abdominal model 100 may be formed from materials that mimic the tissue properties (e.g., elasticity, contractibility, hardness, etc.) of the corresponding structures of the patient's abdomen.

The abdominal wall member 110 may be formed from material(s) that mimics the abdominal wall "W" (FIGS. 2A-2D) of the patient. The abdominal wall member 110 may mimic all layers of an abdominal wall (e.g., the peritoneum, muscle, fascia, fat, and skin), or one or more layers of the abdominal wall. For example, the abdominal wall member 110 may mimic a muscle layer having a defect defined therethrough and an intact outer skin layer to maintain a seal in the abdominal model 100. The abdominal wall member 110 may be, for example, ex-vivo human soft tissue, ex-vivo animal soft tissue, and/or synthetic structures such as, for example, silicon and/or rubber, among other flexible and/or expandable materials within the purview of those skill in the art.

The abdominal wall model insert 101 (e.g., one or more of the ribcage member 104, the pelvis member 108, and/or the lateral abdominal wall member 112), the abdominal viscera member (not shown), and/or the back member 114 (FIG. 1B) may be formed from material(s) that mimic the corresponding structures in the abdomen "A" (FIGS. 2A-2D) of the patient. The abdominal wall model insert 101, the abdominal viscera member (not shown), and/or the back member 114 may be, for example, ex-vivo human bony and/or soft tissue, ex-vivo animal bony and/or soft tissue, and/or synthetic structures such as, for example, metals (e.g., steel, aluminum, metal alloys) and plastics (e.g., thermoplastics such as Plexiglas).

In embodiments, the abdominal wall model insert 101 may be a boundary condition mimicking the attachment of the abdominal wall "W" (FIGS. 2A-2D) to its surrounding bony structures and soft tissue of the abdomen "A". In embodiments, the abdominal viscera member (not shown) may be a boundary condition mimicking the contact of the abdominal viscera "V" in the abdominal cavity "C". In embodiments, the back member 114 may be a boundary condition mimicking the attachment of the pelvis "P", the rib cage "R," and the lateral abdominal wall "L" (FIGS. 2A-2D) to these surrounding bony structures and soft tissue of the abdomen "A."

The abdominal wall model defect (not shown) is any lack of structure in the abdominal wall member 110 that mimics a defect in and/or through at least a portion of a thickness of the abdominal wall "W" (FIGS. 2A-2D) of the patient. For example, the abdominal wall model defect may be an opening, tear, cut, rip, puncture, perforation, etc., within the abdominal wall member 110.

The abdominal model cavity 102 is a chamber that may or may not contain the abdominal viscera member (not shown) and is delimited by the abdominal wall member 110, the abdominal model insert 101, and the back member 114. Environmental parameters of the abdominal cavity "C" (FIGS. 2A-2D) of the patient may be represented in the abdominal model cavity 102, such as, but not limited to, air temperature, air humidity, and air pressure.

Referring again to FIGS. 1A and 1B, in conjunction with FIG. 1D, the abdominal model 100 includes a frame 120 and optionally, a plurality of legs 122 extending therefrom for supporting the frame 120. The frame 120 is formed from one or more components of the abdominal wall model insert 101, such as the ribcage, pelvis, and lateral abdominal wall members 104, 108, and 112, respectively (see e.g., FIG. 1D). In embodiments, the abdominal wall model insert 101 is a six-sided frame 120 simulating a ribcage (including one side representing the sternum to the left lowest floating rib and one side representing the sternum to the right lowest floating rib), a pelvis (including one side representing the pubis bone to the left iliac crest and one side representing the pubis bone to the right iliac crest), and a lateral abdominal wall (including one side representing the left lateral abdominal wall and one side presenting the right lateral abdominal wall). In some embodiments, the dimensions, e.g., the length, of each side of the frame 120 may be symmetrical, and in some embodiments, the dimensions, e.g., the length, of each side of the frame 120 may be asymmetrical depending, for example, on the patient abdomen modeled. In some embodiments, the lengths of the ribcage and pelvis members 104, 108 may be substantially the same, and the length of the lateral abdominal wall member 112 may be less than the lengths of the ribcage and pelvis members 104, 108.

The abdominal wall member 110 and the back member 114 are secured to opposite sides of the abdominal wall model insert 101 in a fluid tight manner to define the abdominal model cavity 102 therein. In a laparoscopic approach, the abdominal surgical procedure is conducted when the abdominal wall is inflated, increasing intra-abdominal pressure and separating the viscera from the abdominal wall to create a workspace. Accordingly, in the abdominal model 100, the abdominal wall member 110 is inflated by air insufflation in the abdominal model cavity 102 and thus, the abdominal model cavity 102 is a closed system that is airtight.

A plurality of openings 124 is defined in one or more components of the abdominal wall model insert 101, such as the ribcage, pelvis, and lateral abdominal wall members 104, 108, and 112, respectively. The openings 124 act as pathways for accessing the abdominal model cavity 102 to, for example, insufflate, pressurize, and/or monitor conditions within the abdominal model cavity 102, and reach structures lying therein (e.g., an inner surface 110*a* of the abdominal wall member 110). In embodiments, the abdominal wall model insert 101 includes at least four openings 124, and in some embodiments, at least one opening 124 is provided in each of four parts (e.g., the ribcage and pelvis members 104, 108) defining the abdominal wall model insert 101. In embodiments, the abdominal wall model insert 101 includes at least six openings 124, and in some embodiments, the abdominal wall model insert 101 includes at least twelve openings 124. The use of multiple pre-formed openings 124 aid in quicker experiment set-up and ease of use for analytical purposes. Access devices/trocars 126 can be positioned within one or more of the plurality of openings 124 for passage of surgical/medical devices and/or surgical implants required for a desired laparoscopic surgical procedure therethrough.

In embodiments, the plurality of openings 124 may be pre-formed in one or more components of the abdominal wall model insert 101, such as the ribcage, pelvis, and lateral abdominal wall members 104, 108, and 112, respectively. In such embodiments, it should be understood that any un-used openings 124 can be plugged/blocked to maintain the fluid tight environment of the abdominal model cavity 102.

As further shown in FIGS. 1A and 1B, an insufflation line 127 extends through an opening 124 of the abdominal wall model insert 101 to control insufflation and pressure within the abdominal model cavity 102, herein referred to as the intra-abdominal model pressure, which is designed to mimic intra-abdominal pressure of an abdomen before/during/after a laparoscopic surgical procedure. The intra-abdominal model pressure simulates the celioscopic intra-abdominal pressure. Insufflation and/or the intra-abdominal model pressure may be controlled by an automated system, such as, but not limited to, a solenoid valve or a medical insufflator, or by a manual system, as is within the purview of those skilled in the art. In embodiments, insufflation is driven manually by using a pressure regulator and the intra-abdominal model pressure is measured by a pressure sensor 128 positioned through one of the openings 124. The intra-abdominal model pressure is adjusted based on its relationship with a patient's intra-abdominal pressure. Additionally or alternatively, the pressure sensor 128, among other sensors such as temperature sensors, humidity sensors, etc. may be secured within the abdominal model cavity 102 to measure/monitor desired environmental conditions of the abdominal model 100 before/during/after a laparoscopic surgical procedure simulation.

While the plurality of openings 124 are shown as being defined in the abdominal wall model insert 101, it should be understood that other locations are contemplated depending on the laparoscopic surgical procedure to be simulated. For example, the abdominal wall member 110 and/or the back member 114 may include openings for accessing the abdominal model cavity 102. The abdominal model 100 is also shown with the abdominal wall member 110 facing downwards to mimic a patient in a prone position. However, it should be understood that the abdominal model 100 may be oriented in other positions, such as with the abdominal wall member 110 facing upwards to mimic a patient in a supine position, as shown, for example, in FIG. 1C.

Figure 1C:
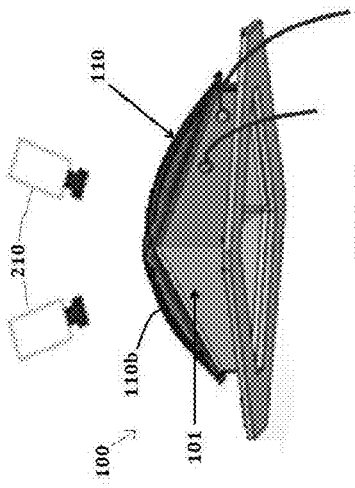
FIG. 1C is a perspective view of the abdominal model of FIGS. 1A and 1B without a plurality of legs and positioned in a different orientation than that of FIGS. 1A and 1B.

With reference to FIGS. 1A, 1B and 1D, the image acquisition and analysis system 200 includes two or more cameras 210, a plurality of markers 220, at least one speckled layer 222*a*, 222*b* (e.g., the inner and/or outer surfaces 110*a*, 110*b* of the abdominal wall member may include the speckled layers 222*a*, 22*b*), and image processing hardware 230 including image processing software 232. The cameras 210 are positioned above the abdominal model 100, facing the back member 114. The back member 114 is fabricated from a transparent material so that the cameras 210 capture images of the abdominal model cavity 102 of the abdominal model 100 before/during/after a laparoscopic surgical procedure simulation. The transparent back member 114 also allows direct viewing of the laparoscopic surgical procedure by a clinician. In embodiments wherein the abdominal cavity includes an abdominal viscera member (not shown), the abdominal viscera member may also be formed from a transparent material thereby further maintaining direct viewing of the laparoscopic surgical procedure by a clinician. Additionally or alternatively, visualization of a surgical procedure simulation can be via cameras (e.g., laparoscopes) positioned through one or more of the openings 124 and extending inside the abdominal model cavity 102. It should be understood that the cameras 210 may be positioned outside of the abdominal model 100 and/or within the abdominal model cavity 102 to view any portion thereof. For example, as shown in FIG. 1C, cameras 210 are positioned external of the abdominal model 100, facing an outer surface 110*b* of the abdominal wall member 110.

The markers 220 are secured to a surgical implant 300 (e.g., a textile-based implant) at the overlap boundary of the surgical implant 300 with the inner surface 110*a* of the abdominal wall member 110, and coincide with the fixation points of the surgical implant 300 to the abdominal wall member 110. It should be understood that the markers 220 may be secured to any portion of the abdominal model 100 and/or surgical implant(s) 300, depending on the desired physical outputs, and the cameras 210 are likewise positioned to track the markers 220.

The speckled layers 222*a*, 222*b* are disposed on or formed as part of the inner and/or outer surfaces 110*a*, 110*b* of the abdominal wall member 110. The speckled layers 222*a*, 222*b* are patterned and/or textured areas that may extend across the entirety of the inner and outer surfaces 110*a*, 110*b* of the abdominal wall member 110, or a portion thereof depending on the desired physical outputs (e.g., a portion of the inner surface 110*a* of the abdominal wall member 110 to which a surgical implant 300 is attached may include the speckled layer 222a). The cameras 210 are positioned to track the speckled layers 222a, 222b.

The image processing hardware and software 230, 232 are used to process the images acquired by the cameras 210. The image processing software 232 analyzes the position of the markers 220 and/or the speckled layers 222a, 222b in a 3D coordinate system, and measures, for example, shape, contour, movement, displacement, deformation, strain, etc. The image processing software 232 visually and/or numerically displays data to allow the clinician to view, for example, the physical outputs and/or the differences between physical inputs and outputs of the simulated laparoscopic surgical procedure on the abdominal model 100.

Examples of physical outputs which could be measured include the defect geometry of the abdominal wall member in a deflated state. This physical output could be deducted from the position and displacement field of the inner and/or outer speckled layers of the abdominal wall member calculated in the deflated state. As another example, the fixation modalities at the deflated state could also be deducted from the strain field close to the fixation points calculated on the inner and/or outer surfaces of the abdominal wall member, which include the speckled layers, in the deflated state.

Any physical output of interest can be calculated using the image acquisition and analysis system 200 and/or external enabling tools. For example, the bulging and shear forces distribution at the fixation points of a textile-based implant could be assessed experimentally or numerically. For a detailed description of exemplary models for making such calculations, reference may be made to European Patent Application Nos. 14306543 and 16305341, the entire contents of each of which are hereby incorporated by reference herein.

Subsequent simulated laparoscopic surgical procedure(s) may be performed with modifications to, for example, the placement of the surgical implant, the fixation distribution and/or fixation modality of the surgical implant, the conditions in which the procedure is performed (e.g., a change in intra-abdominal model pressure at the inflated state), and/or the selection of the surgical implant used (e.g., utilizing a different surgical implant having different performance characteristics and/or size), depending upon the observed physical outputs of the first simulated laparoscopic surgical procedure and the desired physical outputs of the procedure. The physical outputs of the simulated laparoscopic surgical procedures may be compared to each other to assess the effects of the variation(s) and, if desired, further modifications and simulations may be performed. Additionally, qualitative performance characteristics, such as folding, buckling, puckering etc. of the surgical implant, may also be observed by the clinician.

EXAMPLES

Example 1—Patient Specific Abdominal Model

An abdominal model was designed to mimic the abdominal structures of a patient in need of an abdominal wall reinforcement procedure. The modeled abdominal structures, physical structures utilized in the abdominal model, and physical parameters of the physical structures of the abdominal model are listed in Table 1 below.

TABLE 1

Set-up of a patient specific abdominal model

| Modeled Abdominal Structure | Physical Structure/Environment | Physical Parameters |
|---|---|---|
| Abdominal wall member | Flat 8 mm thick silicon structure | Longitudinal radius of curvature of the outer surface<br>Transversal radius of curvature of the outer surface |
| Abdominal wall member defect | Not materialized | |
| Abdominal wall model insert | 3 mm thick steel structure | Length "pubis bone—sternum" ("L3" (FIG. 3C))<br>Length "pubis bone—iliac crest" ("L2" = "L5" (FIG. 3C))<br>Length "sternum—floating rib" ("L1" = "L4" (FIG. 3C))<br>Height "pubis bone—sternum" ("H0" (FIG. 3A))<br>Height "pubis bone—iliac crest" ("H2" = "H5" (FIGS. 3A and 3D))<br>Height "sternum—floating rib" ("H1" = "H4" (FIGS. 3A and 3D))<br>Width "pubis bone—iliac crest"<br>Width "sternum—floating rib" ("W1" = "W2" = "W3" = "W4" (FIG. 3C))<br>Height "lateral abdominal wall" ("H3" = "H6" (FIGS. 3A and 3D)) |
| Abdominal viscera member | Not materialized | |
| Back member | Flat 4 mm thick Plexiglas structure | |
| Abdominal model cavity | Air tight chamber | Deflexion (increase of cavity volume)<br>Intra-abdominal model pressure |

The physical parameters of the abdominal wall member and the abdominal model cavity provided in Table 1 above were calibrated so that the biomechanical behavior of the abdominal wall member during inflation mimicked the biomechanical behavior of the patient's abdominal wall during inflation, as shown in FIGS. 4A and 4B. The deflexion of the abdominal wall member, and the longitudinal and transversal radii of curvature of the outer surface of the abdominal wall member were deducted from the position and the displacement field of the outer surface of the abdominal wall member calculated during inflation of the abdominal wall member using a two camera acquisition system and the 3D digital image correlation software DANTEC™. The abdominal wall member inflation was conducted by air insufflation into the abdominal model cavity, increasing the intra-abdominal model pressure which was measured by a pressure sensor inserted inside the abdominal model cavity. The intra-abdominal pressure was adjusted based on its relationship with the patient intra-abdominal pressure.

The physical parameters of the abdominal model listed in Table 2 below were calibrated and held constant, and the physical parameters listed in Table 3, also below, were not calibrated.

TABLE 2

Abdominal model—physical parameters calibrated remaining constant

| Physical Parameters | Value |
|---|---|
| Length "pubis bone—sternum" ("L3" (FIG. 3C)) | 400 mm |
| Length "pubis bone—iliac crest" ("L2" = "L5" (FIG. 3C)) | 170 mm |
| Length "sternum—floating rib" ("L1" = "L4" (FIG. 3C)) | 170 mm |
| Height "pubis bone—sternum" ("H0" (FIG. 3A)) | 0 mm |
| Height "pubis bone—iliac crest" ("H2" = "H5" (FIGS. 3A and 3D)) | 70 mm |
| Height "sternum—floating rib" ("H1" = "H4" (FIGS. 3A and 3D)) | 70 mm |
| Width "pubis bone—iliac crest" Width "sternum—floating rib" ("W1" = "W2" = "W3" = "W4" (FIG. 3C)) | 400 mm |

TABLE 3

Abdominal model—physical parameters not calibrated

| Physical Parameters | Value |
|---|---|
| Height "lateral abdominal wall" ("H3" = "H6" (FIGS. 3A and 3D)) | 80 mm |

Example 2—Laparoscopic Surgical Procedure Simulated on an Abdominal Model

The abdominal model of Example 1 was set-up for the simulation of a laparoscopic Intra-Peritoneal Onlay Mesh (IPOM) repair procedure. The simulation was designed to assess the physical outputs of a textile-based implant during an abdominal wall reinforcement procedure conducted using a laparoscopic approach to fix the textile-based implant to the inner surface of the abdominal wall member. The surgical procedure, including the technique, surgical/medical devices and implants used, as well as the desired physical outputs are provided in Table 4 below.

TABLE 4

Parameters of surgical procedure simulation

| Technique | Surgical/Medical Devices/Implants | Physical inputs/outputs |
|---|---|---|
| Laparoscopic Intra-Peritoneal Onlay Mesh Target: textile-based implant conformity at the inflated state | Textile-based implant: Symbotex ™ Composite Mesh, 20 cm × 15 cm Fixation Means: Protack ™ Fixation Device Clamps: EndoGrasp ™ Access Devices: Sils ™ Port | Fixation distribution (graphic) Fixation distribution (parameters) Textile-based implant conformity with respect to the inner surface of the abdominal wall member |

The surgical procedure simulation was conducted on the abdominal model with the abdominal wall member facing downwards to mimic a patient lying in a prone position (see e.g., FIG. 1A). The abdominal wall member was inflated to an inflated state of 5 mmHg as intra-abdominal model pressure. The textile-based implant was inserted and deployed inside the abdominal model cavity, centered in conformity against the inner surface of the abdominal wall member, and fixed thereto by tacks. Markers were positioned on each tack. Physical outputs at the inflated state are given in Table 5 below, as well as in FIG. 5A, and a photograph of the textile-based implant conformity with respect to the inner surface of the abdominal wall member is shown in FIG. 5B.

TABLE 5

Physical outputs of a textile-based implant at an inflated state

Figure 5A:
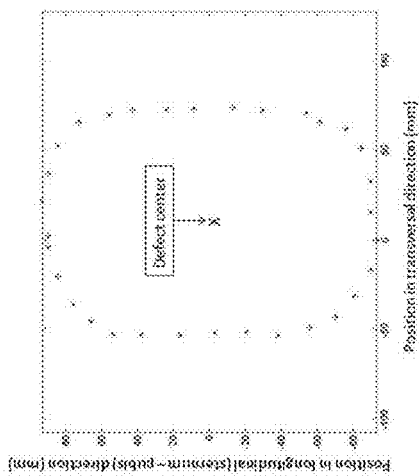
Figure 5B:
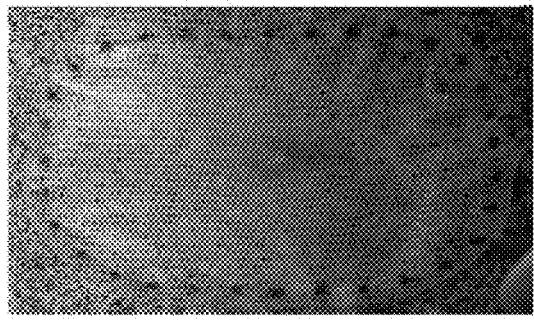

| Physical inputs/outputs | Physical inputs—Inflated state (5 mmHg) |
|---|---|
| Fixation distribution parameters | Simple circle crown: 10 mm from the edge of the textile-based implant Equal fixation distance apart from each other set to 16 mm |
| Fixation distribution graphic | See FIG. 5A |

The abdominal wall member was then deflated to a deflated state upon completion of the surgical procedure simulation. The physical outputs at the deflated state are given in Table 6 below, as well as in FIG. 6A, and a photograph of the textile-based implant non-conformity with respect to the inner surface of the abdominal wall member is shown in FIG. 6B.

The fixation distribution of the textile-based implant at the deflated state was deducted from the position and the displacement of the markers located at the fixation points, and calculated on the layout of the inner surface of the abdominal wall member in the deflated state using a two camera acquisition system and 3D digital image correlation software by VIC-3D™. The 2D coordinate of fixation points was calculated using an arc length calculation between the fixation points along the inner surface of the abdominal wall member, both in the longitudinal and transversal directions, in both the inflated and deflated states.

TABLE 6

Physical outputs of a textile-based implant at a deflated state

Figure 6A:
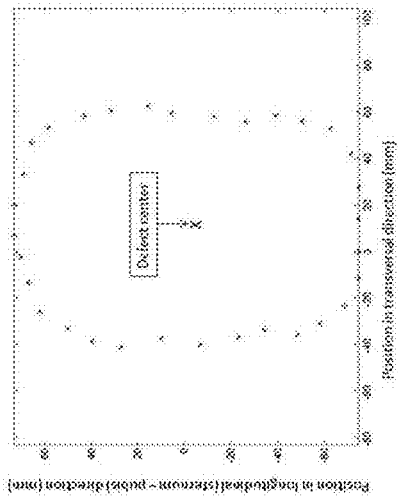
FIGS. 5A and 6A are graphs of the fixation distribution of a textile-based implant in an abdominal model at inflated and deflated states, respectively, in accordance with an example of the present disclosure.
Figure 6B:
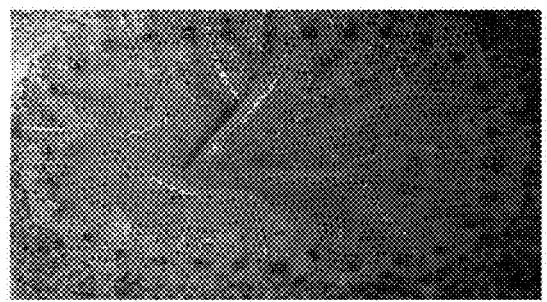
FIGS. 5B and 6B are photographs of the textile-based implant of FIGS. 5A and 6A in the inflated and deflated states, respectively.

| Physical inputs/outputs | Physical outputs—Deflated State |
|---|---|
| Fixation distribution parameters | Simple circle crown: 10 mm from the edge of the textile-based implant Equal fixation distance apart from each other set to 12 mm |
| Fixation distribution graphic | See FIG. 6A |

Shifts between the physical inputs and outputs at the inflated and deflated states, respectively, are provided in Table 7 below, as well as in FIG. 7. The shift of the fixation distribution of the textile-based implant results from the displacement of the fixation points during deflation. The loss of conformity of the textile-based implant between the inflated and deflated states is shown as the layover of the textile-based implant in longitudinal and transversal directions.

TABLE 7

Shift between the physical inputs and outputs

Figure 7:
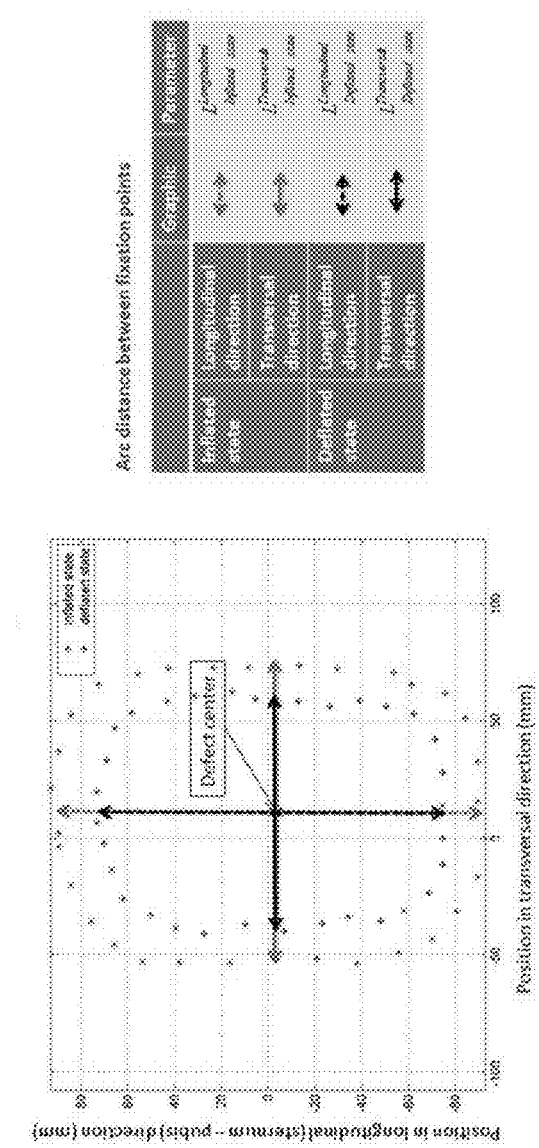
FIG. 7 is a graph of the fixation distribution of the textile-based implant of FIGS. 5A-6B illustrating the shift between the inflated and deflated states.

| Physical inputs/outputs | Shift between the physical inputs (at the inflated state) and the physical outputs (at the deflated state) |
|---|---|
| Fixation distribution graphic | See FIG. 7 |
| Layover of the textile-based implant | Longitudinal direction: $L_{Inflated\ state}^{Longitudinal} - L_{Deflated\ state}^{Longitudinal} \approx 30$ mm<br>Transversal direction: $L_{Inflated\ state}^{Transversal} - L_{Deflated\ state}^{Transversal} \approx 20$ mm |

While embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A physical abdominal surgical simulation system comprising:
    an abdominal model mimicking a patient specific abdomen, the abdominal model including:
        an abdominal wall model insert forming a frame of the abdominal model, the abdominal wall model insert including a ribcage member, a pelvis member, and a lateral abdominal wall member;
        an abdominal wall member having biomechanical properties mimicking the biomechanical response of the patient specific abdomen, the abdominal wall member secured to the abdominal wall model insert;
        a back member secured to the abdominal wall model insert in opposed relation with respect to the abdominal wall member; and
        an abdominal model cavity defined within abdominal wall model insert, the abdominal wall member, and the back member; and
    an image acquisition and analysis system including a plurality of cameras configured to capture images of the abdominal model cavity.

2. The system according to claim 1, wherein the abdominal wall model insert further includes a spinal column member.

3. The system according to claim 1, wherein the ribcage member has a height, a length, and a width mimicking a height, a length, and a width, respectively, from a sternum to a lowest floating rib of the patient specific abdomen.

4. The system according to claim 1, wherein the pelvis member includes a height, a length, and a width mimicking a height, a length, and a width, respectively, from a pubis bone to at least one of a left iliac crest or a right iliac crest of the patient specific abdomen.

5. The system according to claim 1, wherein the lateral abdominal wall includes a height mimicking a height of at least one of a right lateral abdominal wall or a left lateral abdominal wall of the patient specific abdomen.

6. The system according to claim 1, wherein the abdominal model further includes a plurality of openings defined in at least one of the abdominal wall model insert, the abdominal wall member, or the back member.

7. The system according to claim 1, wherein the back member is formed from a transparent material.

8. The system according to claim 7, wherein the plurality of cameras are positioned outside of the abdominal model and facing the back member.

9. The system according to claim 1, further including an insufflation source in fluid communication with the abdominal model cavity.

10. The system according to claim 1, further including at least one sensor disposed within the abdominal model cavity.

11. The system according to claim 6, further including at least one of an access device or a surgical instrument positioned through an opening of the plurality of openings.

12. The system according to claim 11, wherein the access device or the surgical instrument is a SILS™ port, a hand port, a gel port, or a trocar.

13. The system according to claim 1, further comprising at least one surgical implant disposed within the abdominal model cavity of the abdominal model.

14. The system according to claim 13, wherein the at least one surgical implant is secured to an inner surface of the abdominal wall member.

15. The system according to claim 13, wherein the at least one surgical implant is selected from the group consisting of textile-based implants, tissue fixation devices, and combinations thereof.

16. The system according to claim 1, wherein the image acquisition and analysis system further includes a plurality of markers configured to be tracked by the plurality of cameras, the plurality of cameras configured to capture images of the plurality of markers.

17. The system according to claim 16, wherein the plurality of markers are disposed within the abdominal model cavity of the abdominal model.

18. The system according to claim 1, wherein the image acquisition and analysis system further includes image processing software.

19. A method of simulating a laparoscopic surgical procedure in a physical abdominal model mimicking an abdomen of a patient, the method comprising:
  insufflating an abdominal wall member of an abdominal model to a first inflated state, the abdominal wall model including a ribcage member, a pelvis member, and a lateral abdominal wall member;
  securing at least one surgical implant to an inner surface of the abdominal wall member of the abdominal model;
  capturing a first set of images of the at least one surgical implant in the first inflated state;
  deflating the abdominal wall member of the abdominal model to a deflated state; and
  capturing a first set of images of the at least one surgical implant in the deflated state.

20. The method according to claim 19, further comprising comparing the first sets of images of the at least one surgical implant in the first inflated state and the deflated state.

21. The method according to claim 20, further comprising:
  inflating the abdominal wall member of the abdominal model to a second inflated state;
  re-securing the at least one surgical implant on the inner surface of the abdominal wall member of the abdominal model;
  capturing a second set of images of the at least one surgical implant in the second inflated state;
  deflating the abdominal wall member of the abdominal model to the deflated state; and
  capturing a second set of images of the at least one surgical implant in the deflated state.

22. The method according to claim 21, further comprising comparing the first and second sets of images of the at least one surgical implant.

23. The method according to claim 22, wherein re-securing the at least one surgical implant includes varying at least one of placement of the at least one surgical implant, fixation distribution of the at least one surgical implant, fixation modality of the at least one surgical implant, or selection of the at least one surgical implant, and comparing the first and second sets of images includes analyzing at least one physical output based on the variation.

24. The method according to claim 19, wherein at least one marker is disposed on the at least one surgical implant, and capturing the first sets of images of the at least one surgical implant in the inflated and defected states includes capturing the position of the at least one marker.

25. An abdominal model mimicking a patient specific abdomen, the abdominal model comprising:
  an abdominal wall model insert forming a frame of the abdominal model, the abdominal wall model insert including a ribcage member, a pelvis member, and a lateral abdominal wall member;
  an abdominal wall member made from an expandable material and having biomechanical properties mimicking the patient specific abdomen, the abdominal wall member secured to the abdominal wall model insert;
  a back member secured to the abdominal wall model insert in opposed relation with respect to the abdominal wall member; and
  an abdominal model cavity defined within abdominal wall model insert, the abdominal wall member, and the back member.

26. The abdominal model according to claim 25, further comprising a plurality of openings defined in at least one of the abdominal wall model insert, the abdominal wall member, or the back member.

27. The abdominal model according to claim 26, wherein the plurality of openings are defined within the abdominal wall model insert.

28. The abdominal model according to claim 25, wherein the back member is formed from a transparent material.

29. The abdominal model according to claim 25, further including a plurality of legs extending from the frame and supporting the abdominal model.

30. The abdominal model according to claim 25, wherein the abdominal wall member is free of an abdominal defect.

31. The abdominal model according to claim 25, wherein abdominal wall member includes an inner and outer surface, wherein the inner surface is configured to secure at least one surgical implant thereto.

* * * * *